(12) United States Patent
Yang et al.

(10) Patent No.: US 12,237,950 B2
(45) Date of Patent: Feb. 25, 2025

(54) METHOD FOR DETERMINING REMOTE RADIO DEVICE AND DISTRIBUTED AP

(71) Applicant: Huawei Technologies Co., Ltd., Shenzhen (CN)

(72) Inventors: Songzhen Yang, Beijing (CN); Te Wei, Beijing (CN); Zixiang Ma, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/340,107

(22) Filed: Jun. 23, 2023

(65) Prior Publication Data

US 2023/0421416 A1    Dec. 28, 2023

(30) Foreign Application Priority Data

Jun. 24, 2022   (CN) .......................... 202210727148.X

(51) Int. Cl.
*H04W 64/00*    (2009.01)
*H04B 17/318*   (2015.01)
    (Continued)

(52) U.S. Cl.
CPC ..... *H04L 25/03286* (2013.01); *H04B 17/318* (2015.01); *H04L 5/0048* (2013.01);
    (Continued)

(58) Field of Classification Search
CPC ..... G01S 1/68; G01S 5/00; G01S 5/02; G01S 5/14; G01S 19/47; H04B 1/16; H04B 1/40; H04B 1/62; H04B 7/04; H04B 7/06; H04B 7/08; H04B 7/024; H04B 7/0456; H04B 17/12; H04B 17/318; H04L 1/18; H04L 5/00; H04L 5/0048; H04L 25/02; H04L 5/03; H04L 27/00; H04L 27/26; H04W 4/02; H04W 28/02; H04W 36/00;
    (Continued)

(56) References Cited

U.S. PATENT DOCUMENTS

2017/0373890 A1* 12/2017 Fertonani ................ H04L 65/40
2018/0206144 A1*  7/2018 Jiang ................... G01S 5/02213
    (Continued)

FOREIGN PATENT DOCUMENTS

EP              3337195 A1     6/2018

OTHER PUBLICATIONS

Satyanarayana, K. et al., "Adaptive Transceiver Design for C-RAN in mmWave Communications", IEEE Access, vol. 6, Nov. 20, 2017 (Nov. 20, 2017), pp. 16770-16782.

*Primary Examiner* — Shawkat M Ali
(74) *Attorney, Agent, or Firm* — Slater Matsil, LLP

(57) ABSTRACT

A method for determining a remote radio device and a distributed AP are provided. The method includes: A baseband device determines parameters of uplink signals received by N remote radio devices, where N is a natural number greater than 1. The baseband device selects, based on the parameters, at least one remote radio device from the N remote radio devices as a remote radio device in a target set. The baseband device performs decoding based on an uplink signal received by the remote radio device in the target set, or positions a terminal device based on an uplink signal received by the remote radio device in the target set.

18 Claims, 8 Drawing Sheets

(51) Int. Cl.
*H04L 5/00* (2006.01)
*H04L 25/03* (2006.01)
*H04W 72/1268* (2023.01)
*H04W 72/54* (2023.01)

(52) U.S. Cl.
CPC ..... *H04W 64/003* (2013.01); *H04W 72/1268* (2013.01); *H04W 72/54* (2023.01)

(58) Field of Classification Search
CPC .............. H04W 48/20; H04W 64/003; H04W 72/1268; H04W 88/08; H04W 88/085
USPC ................ 375/219, 260, 262, 267, 295, 316
See application file for complete search history.

(56) References Cited

U.S. PATENT DOCUMENTS

| | | | |
|---|---|---|---|
| 2020/0145154 A1* | 5/2020 | Black | H04L 5/0035 |
| 2020/0235788 A1* | 7/2020 | Rajagopal | H04B 7/0848 |
| 2022/0329289 A1* | 10/2022 | Huang | H04B 7/0456 |

* cited by examiner

METHOD FOR DETERMINING REMOTE RADIO DEVICE AND DISTRIBUTED AP

CROSS-REFERENCE TO RELATED APPLICATION

This application claims priority to Chinese Patent Application No. 202210727148.X, filed on Jun. 24, 2022. The afore-mentioned patent application is hereby incorporated by reference in its entirety.

TECHNICAL FIELD

The present invention relates to the field of communication technologies, and in particular, to a method for determining a remote radio device and a distributed AP.

BACKGROUND

With popularization of intelligent devices such as mobile phones and tablets and rapid growth of short video, live streaming, virtual reality, and other applications, people raise higher requirements on a wireless local area network (wireless local area network, WLAN) in terms of a network capacity, a transmission rate, area coverage, service quality, and the like. Therefore, to meet network requirements in various application scenarios, a distributed access point (access point, AP) architecture is used.

The distributed AP includes a baseband unit (baseband unit, BBU) and a remote radio unit (remote radio unit, RRU), and one BBU can support a plurality of RRUs. When a terminal device sends a signal to the AP, the signal may be received by a plurality of RRUs. When the BBU needs to decode the signal sent by the terminal device or position the terminal device, the BBU needs to decode signals received by the plurality of RRUs, and position the terminal device by using the signals received by the plurality of RRUs. However, in the distributed AP architecture, to cover a relatively large area, the plurality of RRUs are deployed far from each other, and differ much in channel conditions, resulting poor decoding or positioning effects when the BBU decodes the signals received by the plurality of RRUs or positions the terminal device.

SUMMARY

This application provides an RRU determining method and a distributed AP, to identify, before performing uplink joint decoding on received uplink signals or positioning a terminal device that sends the uplink signal, an RRU that may cause a high bit error rate or a large positioning error and shield a signal of the RRU, thereby improving decoding accuracy and positioning accuracy of uplink joint reception performed by a plurality of RRUs in a distributed AP architecture.

According to a first aspect, this application provides a method for determining a remote radio device, including: A baseband device determines parameters of uplink signals received by N remote radio devices, where N is a natural number greater than 1. The baseband device selects, based on the parameters, at least one remote radio device from the N remote radio devices as a remote radio device in a target set. The baseband device performs decoding based on an uplink signal received by the remote radio device in the target set, or positions a terminal device based on an uplink signal received by the remote radio device in the target set.

In the foregoing solution, when the baseband device uses the uplink signals received by the plurality of remote radio devices, the baseband device performs selection among the plurality of remote radio devices to retain a remote radio device with a better effect (for example, a lower decoding bit error rate and higher positioning precision) for subsequent decoding or positioning calculation. In this way, when data decoding or terminal positioning is performed by using uplink signals received by a plurality of remote radio devices from a same terminal device, a bit error rate can be reduced or positioning precision can be improved.

In a possible implementation, the parameters further include signal quality parameters of the uplink signals received by the N remote radio devices. That the baseband device selects, based on the parameters, at least one remote radio device from the N remote radio devices as a remote radio device in a target set includes: The baseband device determines, based on the signal quality parameters, at least one remote radio device from the N remote radio devices as a remote radio device in a target set. Quality of an uplink signal received by the remote radio device in the target set is greater than a signal quality threshold.

After the N remote radio devices receive the uplink signals, the baseband device may select, based on the signal quality parameters of the uplink signals received by the N remote radio devices, at least one remote radio device from the N remote radio devices for subsequent decoding or positioning calculation.

In a possible implementation, the parameters of the uplink signals include one or more of the following: a quantity of remote radio devices that receive the uplink signals, time at which the N remote radio devices receive the uplink signals, and line-of-sight indicators and precision contribution values of the N remote radio devices.

When the baseband device needs to perform decoding based on the uplink signals received by the N remote radio devices, the baseband device may select, from the N remote radio devices based on the time at which the N remote radio devices receive the uplink signals, an uplink signal received by at least one remote radio device for a subsequent decoding procedure, to improve decoding performance. When the baseband device needs to position the terminal device based on the uplink signals received by the N remote radio devices, the baseband device may select, based on the quantity of remote radio devices that receive the uplink signals, and the line-of-sight indicators and the precision contribution values of the N remote radio devices, at least one remote radio device from the N remote radio devices for a subsequent positioning procedure, to ensure positioning accuracy.

In a possible implementation, the signal quality parameters include signal strength values, and a signal strength value of the uplink signal received by the remote radio device in the target set is greater than a signal strength threshold.

In a data communication scenario (a received uplink signal needs to be decoded), the baseband device selects an uplink signal with higher signal strength for subsequent decoding, to effectively improve accuracy of subsequent decoding.

In a possible implementation, the signal quality parameters include signal strength values. The baseband device determines a signal strength value of a $1^{st}$ received uplink signal, and records a first time at which the signal strength value is obtained. A signal strength value of the uplink signal received by the remote radio device in the target set is greater than a signal strength threshold, and a time of arrival of the uplink signal received by the remote radio device in the target set is less than or equal to the first time.

After the first uplink signal is received, the baseband device starts to perform selection among a plurality of remote radio devices in a distributed AP system. In this way, when there is a hidden terminal device, a signal collision problem caused by the hidden terminal device can be avoided.

In a possible implementation, a time difference between uplink signals received by any two remote radio devices in the target set is less than a signal guard interval time.

In a data communication scenario, the baseband device determines a time difference between uplink signals received by any two remote devices, to ensure that a delay difference between RRU signals participating in joint decoding is less than a signal guard interval, thereby avoiding intersymbol interference, and finally improving decoding performance.

In a possible implementation, the method further includes: The baseband device determines, based on the parameters, M remote radio devices from the N remote radio devices as remote radio devices in the target set. M is a minimum quantity of remote radio devices required for positioning the terminal device, and 2≤M<N.

In a target positioning scenario, before positioning a target, the baseband device first needs to determine whether a quantity of remote radio devices that receive an uplink signal meets a minimum quantity for positioning the target device. A subsequent operation is performed only when the quantity of remote radio devices that receive the uplink signal meets a requirement, thereby avoiding a waste of resources.

In a possible implementation, that the baseband device selects, based on the parameters, at least one remote radio device from the N remote radio devices as a remote radio device in a target set includes: the baseband device determines, based on a line-of-sight indicator of each remote radio device, M remote radio devices from the N remote radio devices as remote radio devices in the target set.

In a target positioning scenario, the baseband device removes, by determining line-of-sight indicators of uplink signals received by remote radio devices, an uplink signal that undergoes non-line-of-sight propagation, to avoid a positioning error caused by incorrect delay estimation of the uplink signal.

In a possible implementation, after the M remote radio devices are determined, based on the line-of-sight indicator of each remote radio device, from the N remote radio devices as the remote radio devices in the target set, the method further includes: the baseband device compares a precision contribution value of each remote radio device with a precision contribution threshold, and retains, in the target set, a remote radio device whose precision contribution value is greater than the precision contribution threshold.

In a target positioning scenario, the baseband device retains, by determining precision contribution values of remote radio devices, a remote radio device at a relatively proper location and contributing the most to positioning precision, to ensure positioning accuracy under a condition of proper operation complexity.

According to a second aspect, this application provides a distributed AP, including:
a baseband device, configured to determine parameters of uplink signals received by N remote radio devices, where N is a natural number greater than 1.

The baseband device is further configured to select, based on the parameters, at least one remote radio device from the N remote radio devices as a remote radio device in a target set.

The baseband device is further configured to perform decoding based on an uplink signal received by the remote radio device in the target set, or position a terminal device based on an uplink signal received by the remote radio device in the target set.

In a possible implementation, the parameters further include signal quality parameters of the uplink signals received by the N remote radio devices.

The baseband device is further configured to determine, based on the signal quality parameters, at least one remote radio device from the N remote radio devices as a remote radio device in a target set. Quality of an uplink signal received by the remote radio device in the target set is greater than a signal quality threshold.

In a possible implementation, the parameters of the uplink signals include one or more of the following: a quantity of remote radio devices that receive the uplink signals, time at which the N remote radio devices receive the uplink signals, and line-of-sight indicators and precision contribution values of the N remote radio devices.

In a possible implementation, the signal quality parameters include signal strength values, and a signal strength value of an uplink signal received by each remote radio device in the target set is greater than a preset signal strength threshold.

In a possible implementation, the signal quality parameters include signal strength values.

The baseband device is further configured to determine a signal strength value of a $1^{st}$ received uplink signal, and record a first time at which the signal strength value is obtained. A signal strength value of the uplink signal received by the remote radio device in the target set is greater than a signal strength threshold, and a time of arrival of the uplink signal received by the remote radio device in the target set is less than or equal to the first time.

In a possible implementation, a time difference between uplink signals received by any two remote radio devices in the target set is less than a signal guard interval time.

In a possible implementation, the baseband device is further configured to:
determine, based on the parameters, M remote radio devices from the N remote radio devices as remote radio devices in the target set. M is a minimum quantity of remote radio devices required for positioning the terminal device, and 2≤M<N.

In a possible implementation, the baseband device is further configured to:
determine, based on a line-of-sight indicator of each remote radio device, M remote radio devices from the N remote radio devices as remote radio devices in the target set.

In a possible implementation, after determining, based on the line-of-sight indicator of each remote radio device, the M remote radio devices from the N remote radio devices as the remote radio devices in the target set, the baseband device is further configured to:
compare a precision contribution value of each remote radio device with a precision contribution threshold; and
retain, in the target set, a remote radio device whose precision contribution value is greater than the precision contribution threshold.

It may be understood that for beneficial effects of the second aspect, refer to the related description in the first aspect. Details are not described herein again.

BRIEF DESCRIPTION OF DRAWINGS

To describe technical solutions in embodiments of the present invention more clearly, the following briefly introduces accompanying drawings for describing embodiments. It is clear that the accompanying drawings in the following description show merely some embodiments of the present invention, and persons of ordinary skill in the art may still derive another drawing from these accompanying drawings without creative efforts.

DESCRIPTION OF EMBODIMENTS

Figure 1A:
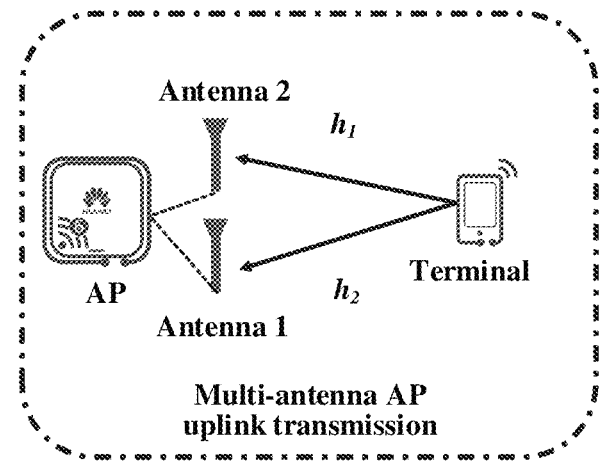
FIG. 1(a) is a schematic diagram of a basic process of uplink joint reception in a multi-antenna AP architecture.

To make objectives, technical solutions, and advantages of embodiments of this application clearer, the following describes the technical solutions in embodiments of this application with reference to accompanying drawings.

In addition, terms "first" and "second" are merely used for a description purpose, and shall not be understood as indicating or implying relative importance or implicitly including indicated technical features. Therefore, features defined with "first" and "second" may explicitly or implicitly include one or more such features. Terms "include", "comprise", "have", and variations thereof all mean "including but not limited to", unless otherwise specified.

Generally, with growing demands of people for networks, to meet network requirements in various application scenarios, a distributed AP architecture is used. The distributed AP includes a BBU and an RRU. The BBU is a baseband unit (baseband device), including main components such as a digital signal processor, a microcontroller, a memory. The BBU processes and stores signal data. The RRU is a remote radio unit (remote radio device), including main components such as a radio frequency front-end module. The RRU transmits a radio frequency signal to an antenna for radiation, and receives a radio frequency signal from the antenna. The RRU and the BBU are connected through an optical port or an electrical port (a network cable, an optical fiber, a photoelectric hybrid cable, or the like). The distributed AP separates an RRU and a BBU of an integrated AP into different devices, so that one BBU can be connected to and support a plurality of RRUs. In the distributed AP, during network deployment, the BBU may be installed in an equipment room or a cabinet together with devices on a wired network side, such as a network control device and a switch. The RRUs are distributed at points that require network access coverage. A coverage capability of each RRU is equivalent to that of a conventional AP. Therefore, one BBU or one distributed AP can achieve a coverage capability of a plurality of APs in a conventional architecture by appropriately controlling lengths of optical fibers and deployment locations of the RRUs, to provide network access in a relatively large area. In addition, a plurality of RRUs belonging to a same distributed AP use a same working channel, avoiding co-channel interference, and effectively improving utilization of spectrum resources and ensuring network throughput performance. When a user terminal moves, even if the user terminal moves from a coverage area of one RRU to a coverage area of another RRU, an associated AP and working channel do not need to be changed provided that the two RRUs belong to a same distributed AP, thereby avoiding service interruption resulting from roaming.

In the distributed AP, after being received by an antenna, a radio signal undergoes a plurality of processing processes from an analog signal to a digital signal and from a radio frequency to a baseband. The distributed AP finds a division point in the plurality of processing processes, where a device part closer to an antenna side in the processing processes as an RRU, and a device part farther away from the antenna side in the processing processes as a BBU. It should be noted that, the foregoing manner of division into the BBU and the RRU in the distributed AP is merely an example, and the division point between the BBU and the RRU in the distributed AP is not unique. In an implementation process, a division point may be selected based on a specific technology. For example, from the perspective of signal reception, if division is performed before an analog-to-digital converter (analog-to-digital converter, ADC), the RRU may be referred to as an analog remote unit. In this case, analog signals are transmitted between the RRU and the BBU. If division is performed after the ADC, the RRU may be referred to as a digital remote unit. In this case, digital signals are transmitted between the RRU and the BBU. In digital remote, if division is performed before fast Fourier transform (fast Fourier transform, FFT), the RRU may be referred to as a baseband digital remote unit. In this case, digital time domain signals are transmitted between the RRU and the BBU. If division is performed after FFT, the RRU may be referred to as an FFT ½ baseband remote unit. In this case, digital frequency domain signals are transmitted between the RRU and the BBU.

Data transmission efficiency can be effectively improved in the distributed AP. However, in an uplink reception process of the distributed AP, if RRUs are densely deployed, and coverage areas of RRUs overlap, a signal transmitted by a terminal device may be received by a plurality of RRUs. Similar to an AP multi-antenna receiving technology, signals of the plurality of RRUs may be comprehensively used to jointly receive uplink data, to reduce a bit error rate and improve transmission efficiency. However, different from the case of the AP multi-antenna receiving technology, the plurality of RRUs of the distributed AP are deployed far from each other, and differ much in channel conditions and receiving delays. Therefore, a common joint reception method is not applicable. In addition, the distributed AP can be used for ranging and positioning the terminal device.

Compared with a method for positioning using a plurality of non-distributed APs, the plurality of RRUs of the distributed AP use a same clock frequency, which saves high-precision time and frequency synchronization calibration and periodic channel switching for receiving a synchronization packet. This is a natural technical advantage. However, in an actual application scenario, as channel conditions of the plurality of RRUs differ much, signals received by some RRUs may cause a relatively large positioning error, which are not suitable for positioning calculation.

Figure 1B:
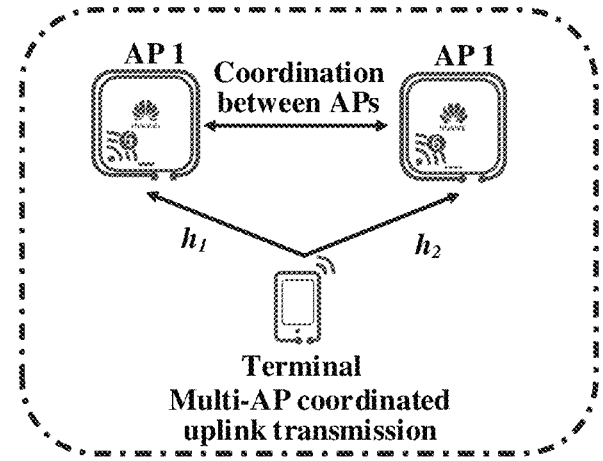
FIG. 1(b) is a schematic diagram of a two-AP coordinated uplink transmission process.

For example, FIG. 1(a) shows a basic process of uplink joint reception in a multi-antenna AP architecture, and FIG. 1(b) shows a basic process of uplink joint reception in a multi-AP coordinated architecture. In both FIG. 1(a) and FIG. 1(b), uplink transmission of a two-antenna AP is used as an example.

In FIG. 1(a), a terminal transmits a signal s to the AP, the two antennas of the AP respectively receive signals $y_1$ and $y_2$, and channel responses from the terminal to the two antennas are denoted as $h_1$ and $h_2$. The AP decodes the transmitted signal by jointly using the signals received by the two antennas, to reduce a bit error rate and improve transmission efficiency. The channel response is a response generated at a receiving end after a transmitting end sends a signal. Different receiving ends have different channel responses due to different propagation paths and factors such as multipath delay spread and Doppler frequency shift.

Similarly, in a two-AP coordinated uplink transmission process shown in FIG. 1(b), a terminal transmits a signal s, the two APs respectively receive signals $y_1$ and $y_2$, and channel responses from the terminal to the two APs are $h_1$ and $h_2$. The two APs are connected in a manner (wired or wireless), and the received signals are transmitted to one of the two APs or another AP at an upper layer for joint decoding.

Generally, when external interference is Gaussian white noise, decoding is performed by using a maximal ratio combining (maximal ratio combining, MRC) technology. In this case, a relationship of the signals received by the APs (or signals received by different antennas of a same AP) is as follows:

$$y=hs+n$$

where $$y = \begin{bmatrix} y_1 \\ y_2 \end{bmatrix}, h = \begin{bmatrix} h_1 \\ h_2 \end{bmatrix}, n = \begin{bmatrix} n_1 \\ n_2 \end{bmatrix},$$

and n is the Gaussian white noise.

At the receiving end, y is decoded to obtain an MRC estimation $\tilde{s}$ of the transmitted signal:

$$\tilde{s} = \frac{h^*}{h^*h} y$$

where $h^*$ represents a conjugate transpose of h.

When external interference is colored interference, or another user transmits a signal (which is also considered as interference) at the same time, decoding may be performed by using an interference rejection combining (interference rejection combining, IRC) technology. In this case, a relationship of the signals is as follows:

$$y=hs+h^i i+n$$

where i represents the colored interference, $$y = \begin{bmatrix} y_1 \\ y_2 \end{bmatrix}, h = \begin{bmatrix} h_1 \\ h_2 \end{bmatrix}, n = \begin{bmatrix} n_1 \\ n_2 \end{bmatrix}, \text{ and}$$

$$h^i = \begin{bmatrix} h_1^i \\ h_2^i \end{bmatrix}$$

represents a channel response corresponding to the colored interference, and n is Gaussian white noise.

At the receiving end, y is decoded to obtain an IRC estimation $\tilde{s}$ of the transmitted signal:

$$\tilde{s}=((L^{-1}h)^*(L^{-1}h)+\sigma I)^{-1}(L^{-1}h)^*(L^{-1}y)$$

where $\sigma^2$ is a variance of the Gaussian white noise n, L is a Cholesky decomposition of a covariance matrix of the interference part $h^i i$, and I is an identity matrix.

In the foregoing solution, when a plurality of received signals are decoded by using the uplink joint reception technology of MRC or IRC, to improve signal-to-noise ratios (signal-to-noise ratios, SNRs) and signal-to-interference-plus-noise ratios (signal-to-interference-plus-noise ratios, SINRs) of the received signals and reduce bit error rates of the signals, first, accuracy of channel measurement needs to be improved. In the plurality of signals that participate in joint reception, if a measured value of a channel response differs much from an actual value, overall decoding accuracy is reduced, and even worse than that in non-joint reception. In addition, a relatively small delay difference between the plurality of signals that participate in joint reception needs to be ensured. If a receiving delay difference between two signals exceeds a signal guard interval (guard interval, GI), intersymbol interference (intersymbol interference, ISI) is caused, and overall decoding accuracy is reduced.

In a multi-antenna AP, a distance between antennas is generally close, and in a multi-AP coordinated scenario, a distance between APs is generally close. In this way, a delay difference between a plurality of received signals is relatively small, and the foregoing requirement can be met. However, in the distributed AP architecture, to achieve a relatively large coverage area, a distance between RRUs may be relatively long. As a result, a delay difference between received signals of some RRUs may be relatively large, and exceed the GI; or SNRs are excessively low, and channel measurement is inaccurate. If the signals of these RRUs participate in joint reception, a reception effect may be reduced.

Figure 2:
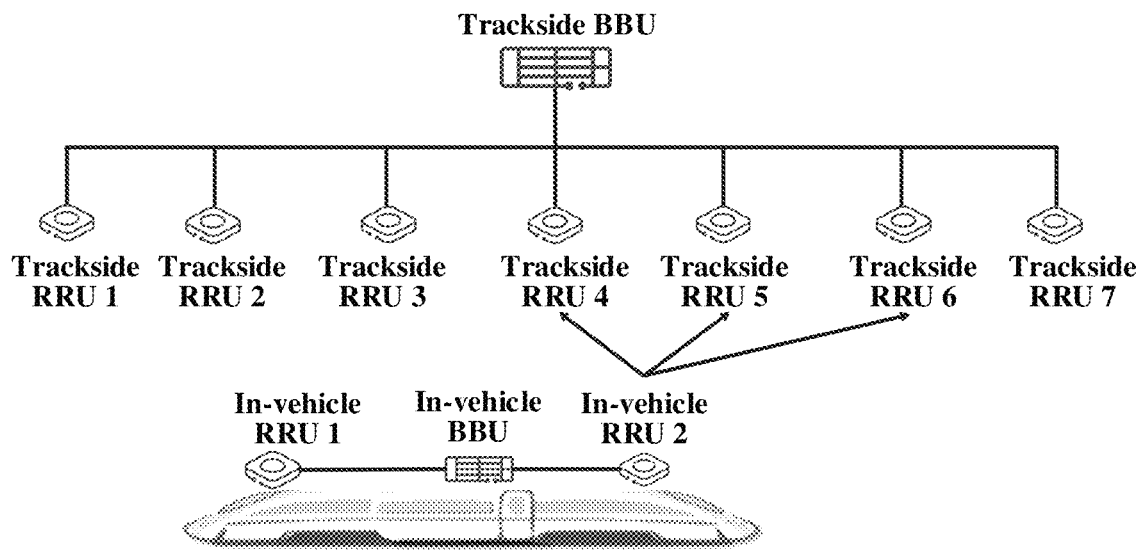
FIG. 2 is a schematic diagram of a rail transport scenario in which a distributed AP is used.

For example, FIG. 2 shows a rail transport scenario in which a distributed AP is used. Refer to FIG. 2. It is assumed that an uplink signal of a train is received by a trackside RRU 4, RRU 5, and RRU 6, and a distance between the RRUs is set to 200 m. In this case, a time difference between uplink signals arriving at the RRU 4 and the RRU 6 is 1.33 μs, which exceeds a signal guard interval GI. As a result, intersymbol interference occurs. In addition, because a distance between an in-vehicle RRU 2 and the trackside RRU 6 is longer, a received signal of the RRU 6 may be weak, and an SNR is low. As a result, channel measurement is inaccurate. In this case, if the signal of the RRU 6 participates in MRC or IRC joint reception, a bit error rate may be high, which is undesirable.

Figure 3:
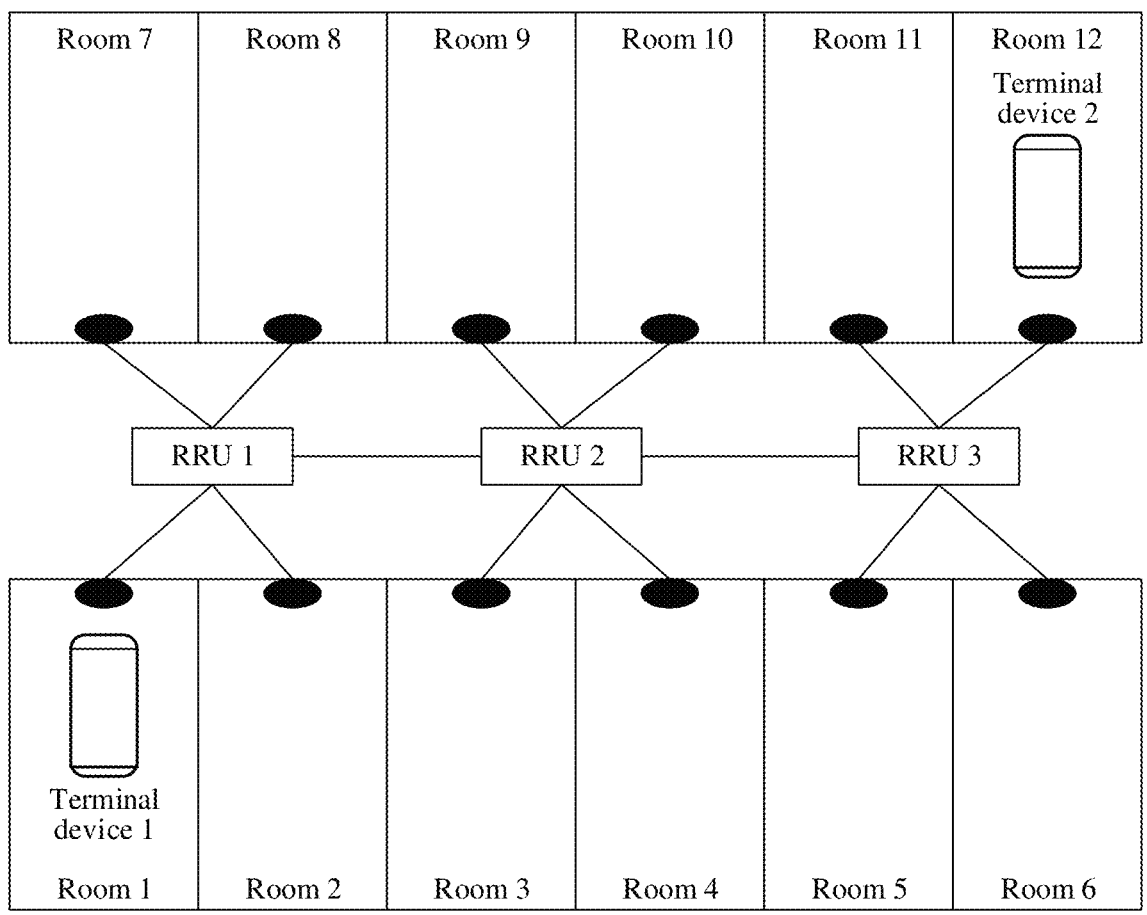
FIG. 3 is a schematic diagram of a communication scenario in which a distributed AP is used.

For example, FIG. 3 shows a communication scenario in which a distributed AP is used. As shown in FIG. 3, the distributed AP system includes three RRUs: an RRU 1, an RRU 2, and an RRU 3. Each RRU covers four rooms. A terminal device 1 is located in a room 1, and a terminal device 2 is located in a room 12. A signal sent by the terminal device 1 can be received by the RRU 1, and a signal sent by the terminal device 2 can be received by the RRU 3. The terminal device 1 and a terminal device 2 are "hidden terminals" of each other. The "hidden terminals" mean that the terminal device 1 and the terminal device 2 do not exchange signals with each other due to factors such as a distance and a block between the rooms. That is, the signal sent by the terminal 1 cannot be received by the terminal device 2, and the signal sent by the terminal device 2 cannot be received by the terminal device 1. According to a CSMA/CA (carrier sense multiple access with collision avoidance) mechanism defined in a WLAN communication protocol, to avoid signal collision, a terminal needs to sense a current channel before sending a signal. If the channel is busy, that is, another terminal device is sending a signal, the terminal backs off and delays signal sending. Conversely, if the channel is idle, the signal can be sent normally. However, in the foregoing scenario, assuming that when the terminal 1 is sending a signal, the terminal 2 also needs to send a signal, because the signal sent by the terminal 1 cannot be received by the terminal 2, the terminal 2 considers that a channel is idle and sends the signal. In this case, the CSMA/CA mechanism fails, and the distributed AP receives the signals of the terminal 1 and the terminal 2 respectively from the RRU 1 and the RRU 3 at the same time. As a result, collision occurs and decoding fails, and the uplink signals of neither terminals can be correctly received.

Because the distributed AP is capable of receiving signals of a plurality of points at different locations, the distributed AP may be further used to position a terminal device, in addition to data transmission. A typical positioning technology includes a time difference of arrival (time difference of arrival, TDOA) positioning technology.

Figure 4:
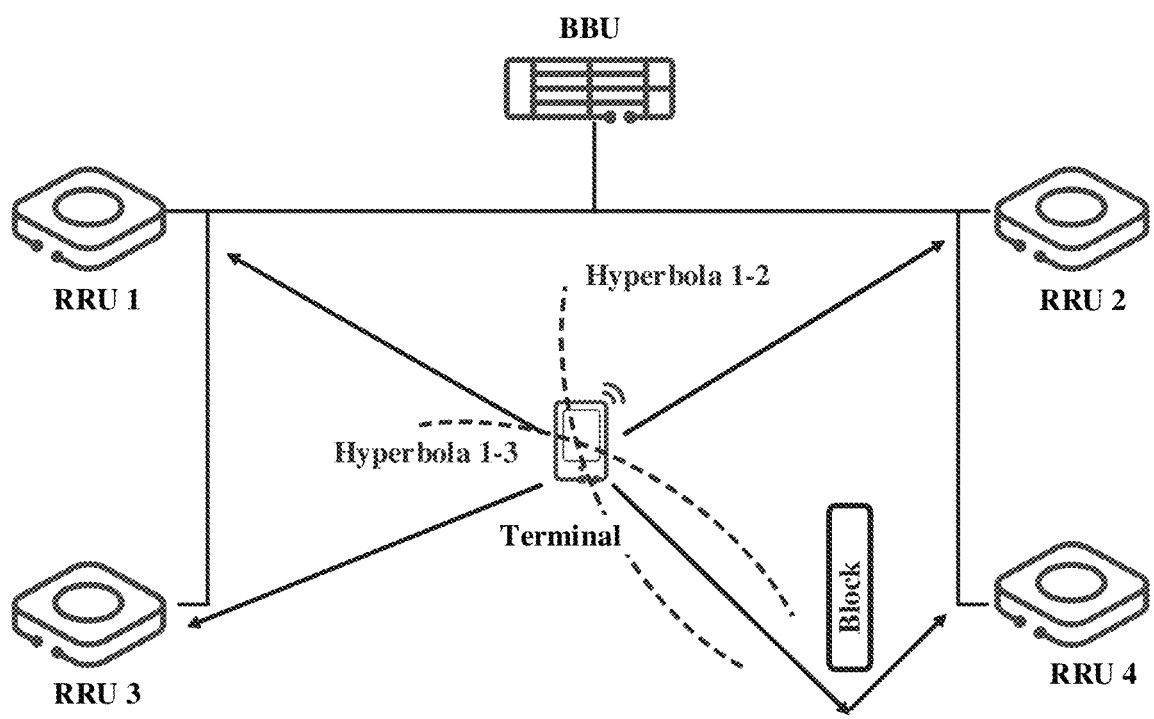
FIG. 4 is a schematic diagram of a principle of performing TDOA positioning by a distributed AP.

For example, FIG. 4 is a schematic diagram of a principle of performing TDOA positioning by a distributed AP. In FIG. 4, a two-dimensional planar space is used as an example. It is assumed that a location of each RRU is known as $(x_i, y_i)$. A location of a terminal device is unknown as $(x, y)$, and is to be obtained through TDOA positioning. A signal sent by the terminal device is received by a plurality of RRUs. When the TDOA technology is used for positioning, a time difference between signals received by different RRUs is measured. It is assumed that an RRU 1 is selected as a reference RRU, a time difference between signals received by the RRU 1 and an RRU 2 is $t_{21}$, and a time difference between signals received by the RRU 1 and an RRU 3 is $t_{31}$. In this case, based on a relationship between a signal propagation distance and a time, $$Ct_{21} = \sqrt{(x_2-x)^2+(y_2-y)^2} - \sqrt{(x_1-x)^2+(y_1-y)^2}$$

$$ct_{31} = \sqrt{(x_3-x)^2+(y_3-y)^2} - \sqrt{(x_1-x)^2+(y_1-y)^2}$$

Location coordinates of the terminal can be obtained by solving the foregoing equation set. Geometrically, the two equations in the equation set represent two curves constituting a hyperbola: 1-2 and 1-3 in FIG. 4. A process of solving the equation set is solving an intersection of the hyperbola. Generally, if a positioning space is a three-dimensional space, and more RRUs (assumed to be K RRUs) participate in measurement, the following equation set is solved by using a first RRU as a reference, where i=2,3,4 . . . K:

$$Ct_{i1} = \sqrt{(x_i-x)^2+(y_i-y)^2+(z_i-z)^2} - \sqrt{(x_1-x)^2+(y_1-y)^2+(z_1-Z)^2}$$

A solution (x,y,z) of the equation set is coordinates of a positioning target.

In the foregoing solution, because the distributed AP has a relatively large coverage area, RRUs are deployed far from each other. If an RRU is relatively far away from the terminal and a received signal is relatively weak, a signal receiving time measurement error of the RRU is relatively large. If the RRU participates in TDOA positioning, there is a relatively large error between a result for positioning the terminal and an actual location of the terminal. In addition, a non-line-of-sight (non-line-of-sight, NLOS) path is also one of positioning problems. As shown in FIG. 4, there is a block between the terminal and an RRU 4, so that the signal cannot be propagated straight from the terminal to the RRU 4. In this case, signal receiving time measurement performed by the RRU 4 cannot truly reflect a geometric location relationship between the terminal and the RRU 4. If the RRU 4 participates in TDOA positioning, there is also a relatively large error in a positioning result. Finally, geometric relationships between the terminal device and a plurality of RRUs participating in TDOA positioning also affect final positioning accuracy.

Therefore, to resolve problems in the foregoing solutions of an excessively high bit error rate during uplink joint decoding due to reasons such as excessively long signal receiving delays of some RRUs in the distributed AP architecture and inaccurate channel measurement, and relatively low TDOA positioning accuracy due to reasons such as inaccurate signal receiving time measurement of some RRUs, NLOS propagation, or an improper geometric relationship, embodiments of this application provide a method for determining a remote radio device. This application is mainly applied to a distributed AP application scenario, for example, rail transport, medical care (nursing ward) sites, education (dormitories and classrooms) sites, gymnasiums, and shopping malls that raise high requirements on area coverage, roaming performance, and a network capacity. In the foregoing application scenario, an RRU that may cause a high bit error rate or a large positioning error is identified and a signal of the RRU is shielded before uplink joint decoding is performed on received uplink signals or a terminal device that sends the uplink signal is positioned, thereby improving decoding accuracy and positioning accuracy of uplink joint reception performed by a plurality of RRUs in a distributed AP architecture.

Figure 5:
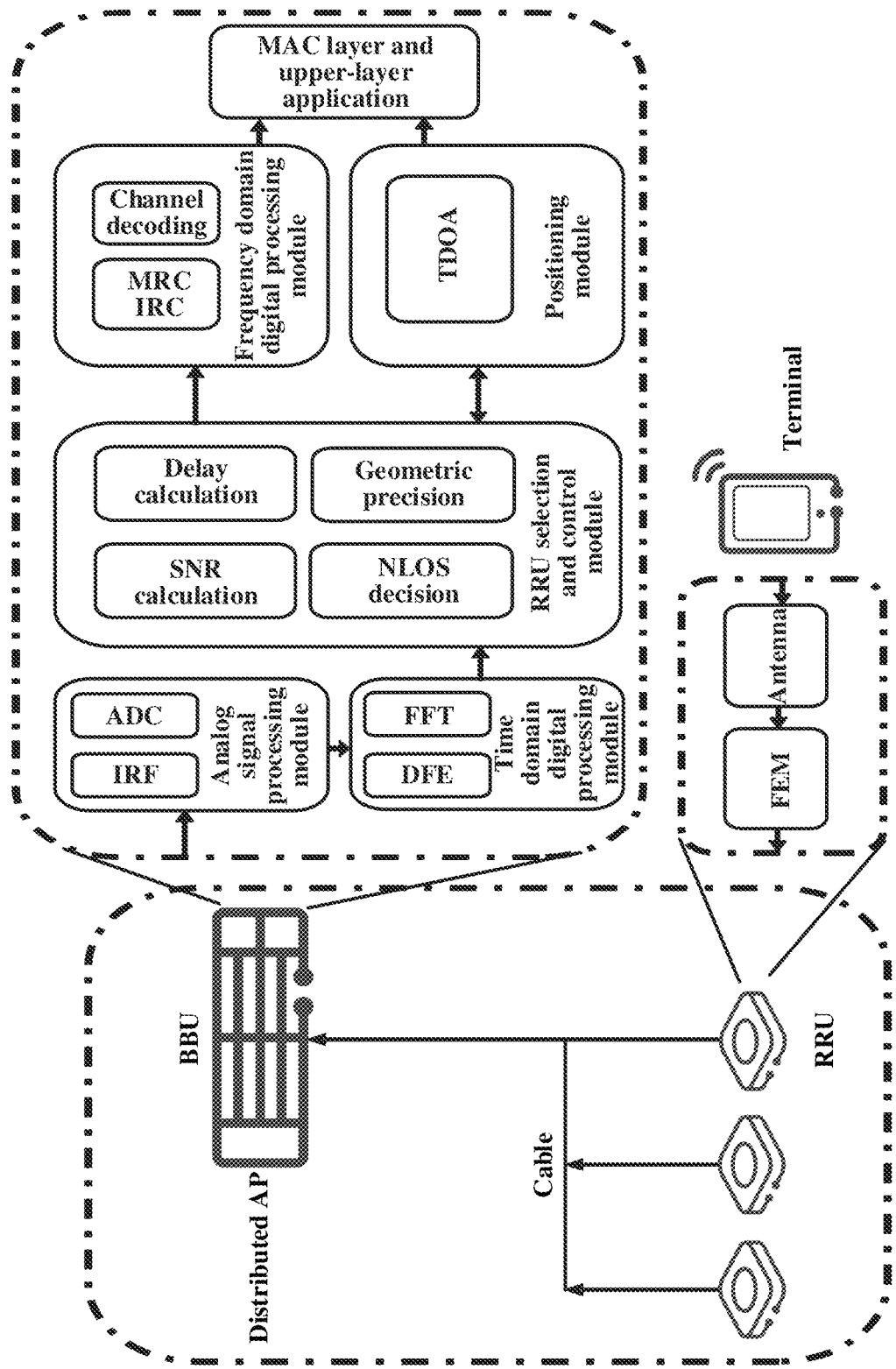
FIG. 5 is a schematic diagram of an architecture of a distributed AP system according to an embodiment of this application.

For example, FIG. 5 is a schematic diagram of an architecture of a distributed AP system according to an application of this application. As shown in FIG. 5, the distributed AP system includes a distributed AP and a terminal device. The terminal device is a mobile device that requires a wireless service (including data communication or positioning), for example, a mobile phone, a tablet, or a notebook computer. The distributed AP includes a BBU and a plurality of RRUs. The RRUs are connected to the BBU via cables. The RRU receives and processes an uplink radio frequency signal of the terminal device, and transmits a processed signal to the BBU. The BBU performs a series of processing such as analog domain processing, digital time domain processing, and digital frequency domain processing on the signal transmitted from the RRU, for example, decoding a received uplink signal or positioning the terminal device.

Next, components of the distributed AP are described based on FIG. 5.

First, the remote radio unit (RRU) is described. The RRU is a component of the distributed AP. The RRU mainly receives and processes a radio frequency signal of the terminal device. As shown in FIG. 5, the RRU mainly includes components and modules such as an antenna and a radio frequency front-end module (FEM) inside. The antenna receives and sends electromagnetic waves over an air interface. The radio frequency front-end module processes radio frequency signals. The radio frequency front-end processing module mainly includes components such as an antenna switch and a power amplifier.

Next, the baseband unit (BBU) is described. The BBU is a component of the distributed AP. The BBU completes baseband processing of signals, such as channel coding and decoding, and modulation and demodulation. The BBU further provides transmission management and an interface, for example, performing functions such as managing radio resources and providing a clock signal. As shown in FIG. 5, the BBU includes: an analog signal processing module, a time domain digital processing module, an RRU selection and control module, a frequency domain digital processing module, a positioning module, and a MAC layer and upper-layer application.

The analog signal processing module converts an analog domain signal transmitted from the RRU into a digital domain signal. In a possible example, the analog signal processing module includes components such as an intermediate radio frequency converter (IRF) and an analog-to-digital converter (ADC).

The time domain digital processing module converts the converted time domain digital signal into a frequency domain signal. In a possible example, the time domain digital processing module includes components such as a decision feedback equalizer (DFE) and a fast Fourier transform component (FFT).

The RRU selection and control module calculates and analyzes, based on a specific application purpose (data communication or positioning), signals transmitted from the RRUs connected to the BBU, and determines signal data of which RRUs can be used for further calculation and processing. In a possible example, the RRU selection and control module includes: an SNR calculation module, a delay calculation module, an NLOS decision module, a geometric precision calculation module, and the like. The SNR calculation module calculates an SNR of a received signal of each RRU. Only an RRU whose signal SNR exceeds a threshold participates in a decoding process in joint reception. The delay calculation module calculates a relative delay of the received signal of each RRU. Only RRUs between which a relative delay difference is less than a GI participate in the decoding process in joint reception. The NLOS decision module determines whether the received signal of each RRU is propagated on a line-of-sight path. Only RRUs whose signals are propagated on a line-of-sight path participate in a positioning process in joint reception. The geometric precision calculation module calculates a geometric precision factor of a TDOA positioning algorithm for current RRU selection. Only RRUs whose contribution to precision exceeds a threshold participate in the positioning process in joint reception.

The frequency domain digital processing module processes a frequency domain digital signal based on a result of the RRU selection and control module, to obtain bit data. The frequency domain digital processing module mainly includes an MRC/IRC receiving equalizer, a decider, and a channel decoder.

The positioning module runs a positioning algorithm such as TDOA, and calculates and analyzes a signal based on the result of the RRU selection and control module, to obtain location information of the terminal device.

The MAC layer and upper-layer application performs upper-layer functions such as access control, and packet encapsulation and forwarding.

It may be understood that the structure shown in embodiments of this application does not constitute any specific limitation on the distributed AP system. In some other embodiments of this application, the distributed AP system may include more or fewer components than those shown in the figure, or combine some components, or split some components, or have a different component arrangement (for example, components such as the analog signal processing module and the time domain digital processing module are placed on the RRU instead of the BBU). The components shown in the figure may be implemented by using hardware, software, or a combination of software and hardware.

Next, the method for determining a remote radio device provided in embodiments of this application is described based on the content described above.

Figure 6:
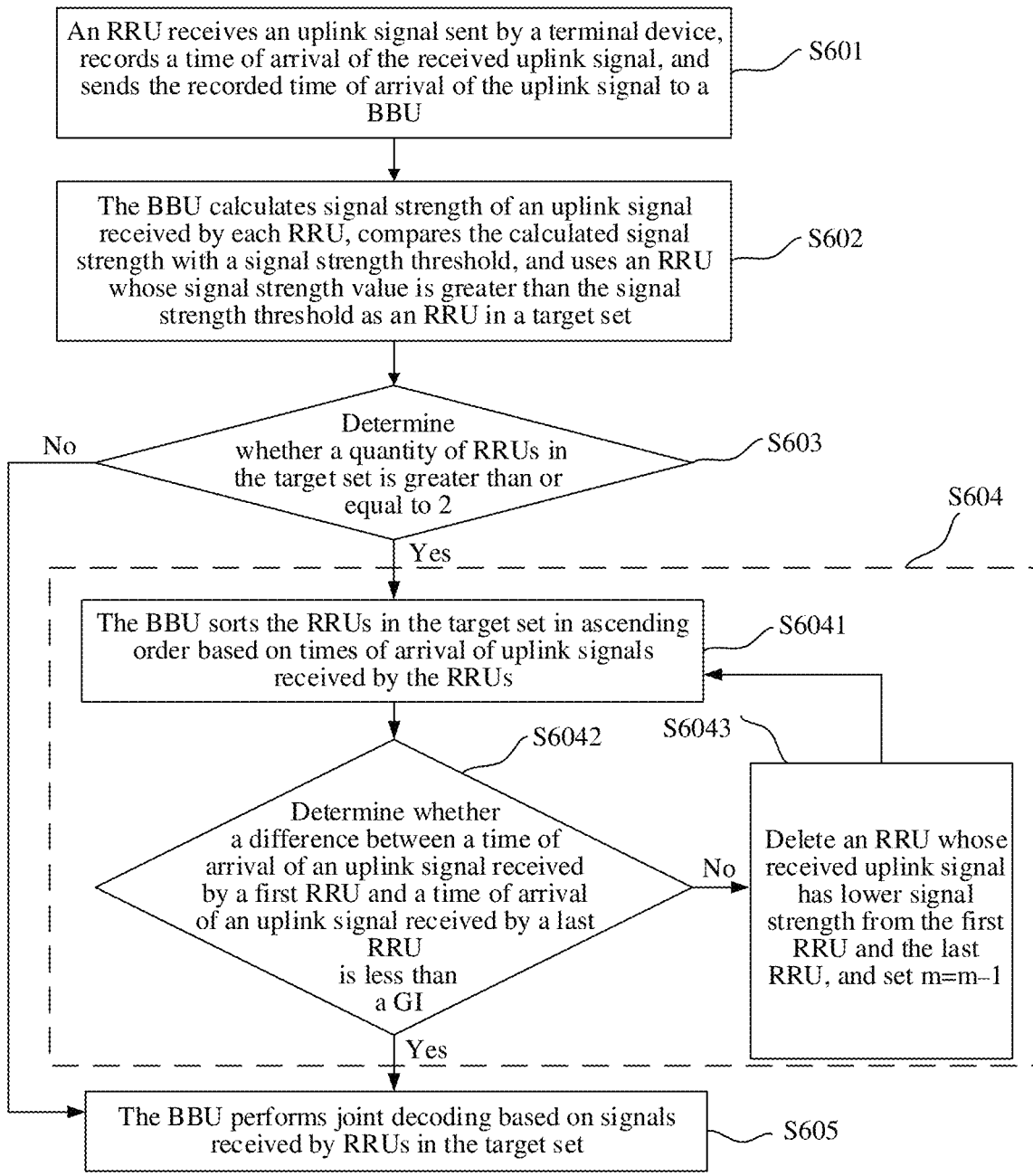
FIG. 6 is a flowchart of a method for determining a remote radio device according to an embodiment of this application.

For example, FIG. 6 provides a flowchart of a method for determining a remote radio device. The method may be applied to, but is not limited to, the scenario shown in FIG. 5 in which data communication is performed through uplink joint reception of a plurality of RRUs in a distributed AP. Refer to FIG. 6. The method includes S601 to S605.

S601. An RRU receives an uplink signal sent by a terminal device, records a time of arrival of the received uplink signal, and sends the recorded time of arrival of the uplink signal to a BBU.

In this embodiment, each RRU in a distributed AP receives the uplink signal sent by the terminal device, and then records a time of arrival of the uplink signal received by the RRU.

It should be noted that, when the distributed AP includes N RRUs, N uplink signals received by the N RRUs are N copies of a same uplink signal sent by a same terminal device, where N is a natural number greater than 1. That is, after the terminal device sends an uplink signal to the distributed AP, the uplink signal is received by the N RRUs after transmitted on different transmission paths. The signal has different energy losses on different transmission paths. Therefore, the uplink signals received by the N RRUs are different.

S602. The BBU calculates signal strength of an uplink signal received by each RRU, compares the calculated signal strength with a signal strength threshold, and uses an RRU whose signal strength value is greater than the signal strength threshold as an RRU in a target set.

In this embodiment, after the BBU receives the uplink signal sent by each RRU, the BBU may perform selection among a plurality of RRUs based on a parameter of the received uplink signal. The parameter of the uplink signal may be a signal quality parameter of the uplink signal, and may be specifically a signal strength value of the uplink signal.

In a possible example, the BBU parses an uplink signal received by each of the plurality of RRUs, to determine signal strength of the received uplink signal. The BBU parses a physical layer convergence procedure protocol data unit (physical layer convergence procedure protocol data unit, PPDU) header of the received uplink signal, to obtain information such as a GI length, bandwidth, and resource unit (resource unit, RU) allocation of the uplink signal received by each RRU. Then, the BBU may determine, based on the bandwidth and RU allocation information of the uplink signal received by each RRU, the signal strength of the uplink signal received by each RRU.

In a possible example, the BBU may determine, based on a signal-to-noise ratio or a signal-to-interference-plus-noise ratio of the uplink signal received by the RRU, the signal strength of the uplink signal received by the RRU. In this example, the signal-to-noise ratio of the uplink signal received by the RRU is used as an example for description.

The BBU may calculate, based on the bandwidth and RU allocation information of the uplink signal received by each RRU, a signal-to-noise ratio (SNR) of the uplink signal received by each RRU. A larger signal-to-noise ratio of the uplink signal received by the RRU indicates higher signal strength of the uplink signal received by the RRU. Specifically, the signal-to-noise ratio of the uplink signal received by each RRU may be calculated as follows:

$$SNR = 10 \log \left( \frac{\sum_k^{N_{sc}} |H_k X_k|^2}{\sum_k^{N_{sc}} |Y_k - H_k X_k|^2} \right)$$

where $N_{sc}$ represents a quantity, obtained based on channel bandwidth and RU allocation information, of subcarriers occupied by the signal, and $Y_k$, $X_k$, and $H_k$ respectively represent a received signal, a transmitted signal (a training sequence), and channel measurement on a $k^{th}$ subcarrier.

The BBU calculates the signal-to-noise ratio $SNR_i$ of the uplink signal received by each RRU, where $1 \leq i \leq N$. Then, the BBU compares the signal-to-noise ratio $SNR_i$ of the uplink signal received by each RRU with the signal strength threshold (which may be a signal-to-noise ratio threshold $SNR_t$). If $SNR_i \geq SNR_t$, the RRU that receives the uplink signal is used as an RRU in the target set.

In a possible example, the signal strength threshold is a user-predefined value. If the BBU determines, based on the calculated signal-to-noise ratio of the uplink signal received by each RRU, the signal strength of the uplink signal received by each RRU, the signal strength threshold may be a signal-to-noise ratio threshold. For example, the threshold is set to 20 dB. The threshold may be adjusted based on an actual requirement. Generally, it is considered that an uplink signal that is received by an RRU and whose SNR is lower than the threshold has adverse impact on a decoding effect.

In this embodiment, an RRU signal with an excessively low SNR is removed through threshold-based filtering, avoiding adverse impact of its channel measurement with an excessively large error on joint decoding.

It should be noted that, in this embodiment, after receiving the uplink signal sent by the terminal device, the plurality of RRUs send the received uplink signals to the BBU, and the BBU performs selection based on signal strength of the uplink signals received by the RRUs, to determine uplink signals received by which RRUs participate in subsequent decoding. However, in another possible embodiment, after each of the plurality of RRUs receive the uplink signal sent by the terminal device, the RRU may determine whether the uplink signal received by the RRU meets a condition for participating in decoding (for example, whether signal strength is greater than the preset signal strength threshold). Only when the uplink signal received by the RRU meets the condition for participating in decoding, the RRU sends the uplink signal to the BBU. However, to avoid a problem that the BBU cannot perform clear channel assessment (clear channel assessment, CCA) when the BBU receives no uplink signal sent by the RRU, and further the BBU incorrectly considers that a spatial channel on which the RRU is located is clear, when the RRU determines that the uplink signal received by the RRU meets the condition for participating in decoding, and the RRU chooses not to send the signal to the BBU, the RRU still needs to transmit some information (such as an RSSI of the signal) to the BBU, so that the BBU learns that the RRU receives the signal and learns of a strength value of the signal (the information may be transmitted on a control signal path between the BBU and the RRU). This is distinguished from a case in which the RRU receives no signal, facilitating the BBU to perform correct clear channel assessment.

S603. The BBU determines a quantity of RRUs in the target set. When the quantity of RRUs in the target set is greater than or equal to 2, step S604 is performed; otherwise, step S605 is performed.

In this embodiment, after the BBU determines the target set, to achieve a better decoding effect and reduce a calculation amount in a decoding process, the BBU may further filter the RRUs in the target set based on a parameter of an uplink signal received by each RRU in the target set. For example, when the quantity of RRUs in the target set is greater than or equal to 2, the BBU filters the RRUs in the target set based on a time of arrival of the uplink signal received by each RRU in the target set, so that a delay difference between uplink signals participating in signal decoding is less than a GI, thereby avoiding intersymbol interference.

S604. The BBU determines a time difference of arrival of uplink signals received by any two RRUs in the target set, and updates the target set based on the time difference of arrival, so that a time difference of arrival of uplink signals received by any two RRUs in the target set is less than the GI.

In this embodiment, in the distributed AP architecture, to cover a relatively large area, a distance between RRUs may be long, resulting in a large delay, which exceeds the GI, between uplink signals received by some RRUs. In this case, if the uplink signals received by these RRUs are used for decoding, decoding accuracy is reduced. Therefore, to improve accuracy of decoding, by the BBU, the uplink signal sent by the terminal device, the BBU may continue to perform selection among the RRUs in the target set based on parameters of uplink signals received by the RRUs in the target set. The parameters of the uplink signals may be times of arrival of the uplink signal received by the RRUs in the target set. The BBU updates the target set based on the times of arrival of the uplink signals received by the RRUs in the target set, so that a time difference of arrival of uplink signals received by any two RRUs in the target set is less than the GI.

In a possible example, it is assumed that there are m RRUs ($RRU_1$ to $RRU_m$) in the target set, and a time of arrival of an uplink signal received by each RRU is $Rt_i$, where m is a natural number greater than 1, and i is less than or equal to m. In this case, a process in which the BBU updates the target set based on a time difference of arrival of uplink signals received by any two RRUs in the target set includes S6041 to S6043. S6041. The BBU sorts the RRUs in the target set in ascending order based on the times of arrival of the uplink signals received by the RRUs, to obtain a sorting result $\{RRU_1, RRU_2 \ldots RRU_m\}$. S6042. The BBU determines whether a time difference of arrival ($Rt_m - Rt_1$) between the first $RRU_1$ and the last $RRU_m$ is less than the GI. When $Rt_m - Rt_1$ is less than the GI, step S605 is performed; otherwise, step S6043 is performed. S6043. The BBU compares signal strength of uplink signals received by $RRU_1$ and $RRU_m$, and when the signal strength of the uplink signal received by $RRU_1$ is less than the signal strength of the uplink signal received by $RRU_m$, the BBU deletes $RRU_1$ from the target set; otherwise, the BBU deletes $RRU_m$ from the target set. It is set that m=m−1, and the BBU continues to perform S6041.

In this embodiment, a relative delay difference is determined, which ensures that a signal delay difference between RRUs participating in joint decoding is less than the GI, and avoids intersymbol interference. In this way, only RRUs whose SNRs are greater than the threshold and whose relative delay difference is less than the threshold can participate in a subsequent decoding procedure, improving decoding performance.

It should be noted that, S601, S603, and S604 are optional steps. When the BBU selects an RRU, the BBU may determine the RRUs in the target set based on the signal strength of the uplink signal received by each RRU. Then, decoding is performed based on the uplink signal received by each RRU in the determined target set. In this case, the BBU does not need to obtain the time of arrival of the uplink signal received by each RRU in the target set, nor filter the RRUs in the target set based on the time of arrival of the uplink signal received by each RRU in the target set.

S605. The BBU performs joint decoding based on signals received by RRUs in the target set.

In this embodiment, after the BBU determines the target set, the BBU performs joint decoding based on the uplink signal received by each RRU in the target set. When the BBU performs joint decoding on the uplink signal received by each RRU in the target set, the BBU may perform decoding by using an MRC technology or an IRC technology. A process in which the BBU performs decoding by using the MRC or IRC technology is the same as the process in which the BBU performs decoding by using the MRC or IRC technology in FIG. 1, and details are not described herein again.

In this embodiment of this application, when the BBU performs data decoding by using the uplink signals received by the plurality of RRUs from the same terminal device, the BBU may select an RRU based on parameters of the uplink signals received by the RRUs. For example, the BBU may select an RRU based on the signal strength of the uplink signal received by each RRU, and retain an RRU with higher received uplink signal strength for the subsequent decoding procedure, thereby reducing a bit error rate. Further, the BBU may further filter RRUs in the target set based on the time of arrival of the uplink signal received by each RRU, so that a delay difference between uplink signals participating in signal decoding is less than the GI, thereby avoiding intersymbol interference, and reducing a calculation amount in the decoding process while ensuring decoding accuracy.

Figure 7:
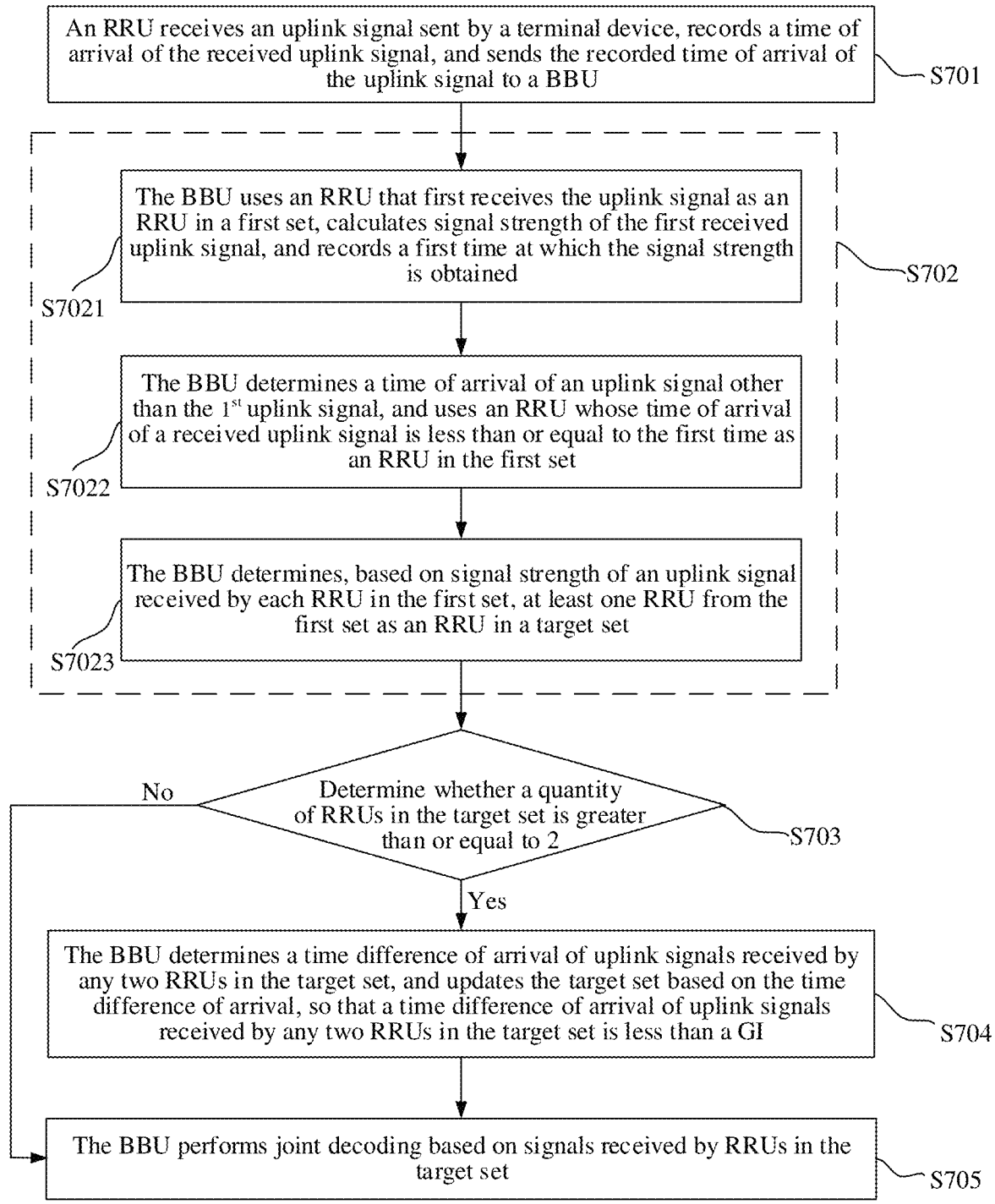
FIG. 7 is a flowchart of another method for determining a remote radio device according to an embodiment of this application.

For example, FIG. 7 provides a flowchart of a method for determining a remote radio device. The method may be applied but is not limited to the communication scenario shown in FIG. 3. Refer to FIG. 7. The method includes S701 to S705.

S701. An RRU receives an uplink signal sent by a terminal device, records a time of arrival of the received uplink signal, and sends the recorded time of arrival of the uplink signal to a BBU.

In this embodiment, a distributed AP includes a plurality of RRUs. Each RRU receives the uplink signal sent by the terminal device, and then records a time of arrival of the uplink signal received by the RRU. Then, each RRU sends the received uplink signal and the time of arrival of the uplink signal to the BBU.

S702. After the BBU receives a $1^{st}$ first uplink signal sent by an RRU, the BBU selects, based on the uplink signal, at least one RRU from the plurality of RRUs as an RRU in a target set.

In this embodiment of this application, after the BBU receives the first uplink signal, the BBU may perform selection among the plurality of RRUs in the distributed AP system based on a parameter of the received uplink signal, so that when there is a hidden terminal device, and there is a sufficient time difference (tens of microseconds) between signal sending of the hidden terminal device and signal sending of the terminal device in this embodiment of this application, a signal collision problem caused by the hidden terminal device can be avoided. In a possible example, the parameter of the uplink signal may be a signal quality parameter (for example, a signal strength value) of the uplink signal. Specifically, a process in which the BBU selects, based on a $1^{st}$ received uplink signal, at least one RRU from the plurality of RRUs as an RRU in a target set includes S7021 to S7023. S7021. The BBU uses an RRU that first receives the uplink signal as an RRU in a first set, calculates signal strength of the $1^{st}$ received uplink signal, and records a first time at which the signal strength is obtained. S7022. The BBU determines a time of arrival of another uplink signal other than the first uplink signal, and uses an RRU whose time of arrival of a received uplink signal is less than or equal to the first time as an RRU in the first set. S7023. The BBU determines, based on signal strength of an uplink signal received by each RRU in the first set, at least one RRU from the first set as an RRU in the target set.

It should be noted that, the first time in S7021 is later than the time of arrival of the first uplink signal. In addition, in S7023, the BBU calculates the signal strength of the uplink signal received by each RRU in the first set, compares the calculated signal strength with a signal strength threshold, and uses an RRU whose signal strength value is greater than the signal strength threshold as an RRU in the target set. When the signal strength of the uplink signal received by each RRU in the first set is less than the preset signal strength threshold, the BBU may use the RRU that first receives the uplink signal as an RRU in the target set. Alternatively, when the signal strength of the uplink signal received by each RRU in the first set is less than the preset signal strength threshold, the BBU may use an RRU with largest received uplink signal strength in the first set as an RRU in the target set.

In a possible example, with reference to the communication scenario shown in FIG. 3, the terminal device 1 first sends an uplink signal, and after receiving the signal, the RRU 1 immediately sends the signal to the BBU. The BBU calculates a signal-to-noise ratio of the uplink signal received by the RRU 1. Then, the BBU immediately performs corresponding RRU selection. In this case, because the RRU 2 and the RRU 3 do not receive the signal sent by the terminal device 1, SNRs of signals received by the RRU 2 and the RRU3 naturally cannot meet a specified threshold. Therefore, the signals received by the RRU 2 and the RRU 3 are shielded. When the terminal device 2 needs to send a signal, the terminal device 2 first senses a current channel. Because the terminal device 2 cannot receive the signal sent by the terminal device 1, the terminal device 2 may determine that the current channel is clear, and send the signal. The RRU 3 can receive the signal sent by the terminal device 2. However, because the BBU has started the RRU selection, the signal of the RRU 3 is shielded, and the signal received by the RRU 3 cannot participate in decoding this time.

Therefore, the signal of the terminal device 1 is not interfered with, and can be normally received and decoded. Communication of the terminal device 2 fails this time, and retransmission or other processing is performed subsequently depending on a specific situation.

S703. The BBU determines a quantity of RRUs in the target set. When the quantity of RRUs in the target set is greater than or equal to 2, step S704 is performed; otherwise, step S705 is performed.

S704. The BBU determines a time difference of arrival of uplink signals received by any two RRUs in the target set, and updates the target set based on the time difference of arrival, so that a time difference of arrival of uplink signals received by any two RRUs in the target set is less than a GI.

S705. The BBU performs joint decoding based on signals received by RRUs in the target set.

It should be noted that, specific implementations of S703 to S705 are the same as those of S603 to S605, and details are not described herein again. S701, S703, and S704 are optional steps. After the BBU selects, based on the $1^{st}$ received uplink signal, at least one RRU from the plurality of RRUs as an RRU in the target set, the BBU may directly perform decoding based on an uplink signal received by the RRU in the target set. In this case, the BBU does not need to obtain the time of arrival of the uplink signal received by each RRU in the target set, nor filter the RRUs in the target set based on the time of arrival of the uplink signal received by each RRU in the target set.

In this embodiment of this application, after receiving the first uplink signal, the BBU starts to perform selection among the plurality of RRUs in the distributed AP system, so that when there is a hidden terminal device, and there is a sufficient time difference (tens of microseconds) between signal sending of the hidden terminal device and signal sending of the terminal device in this embodiment of this application, a signal conflict problem caused by the hidden terminal device can be avoided.

Figure 8A:
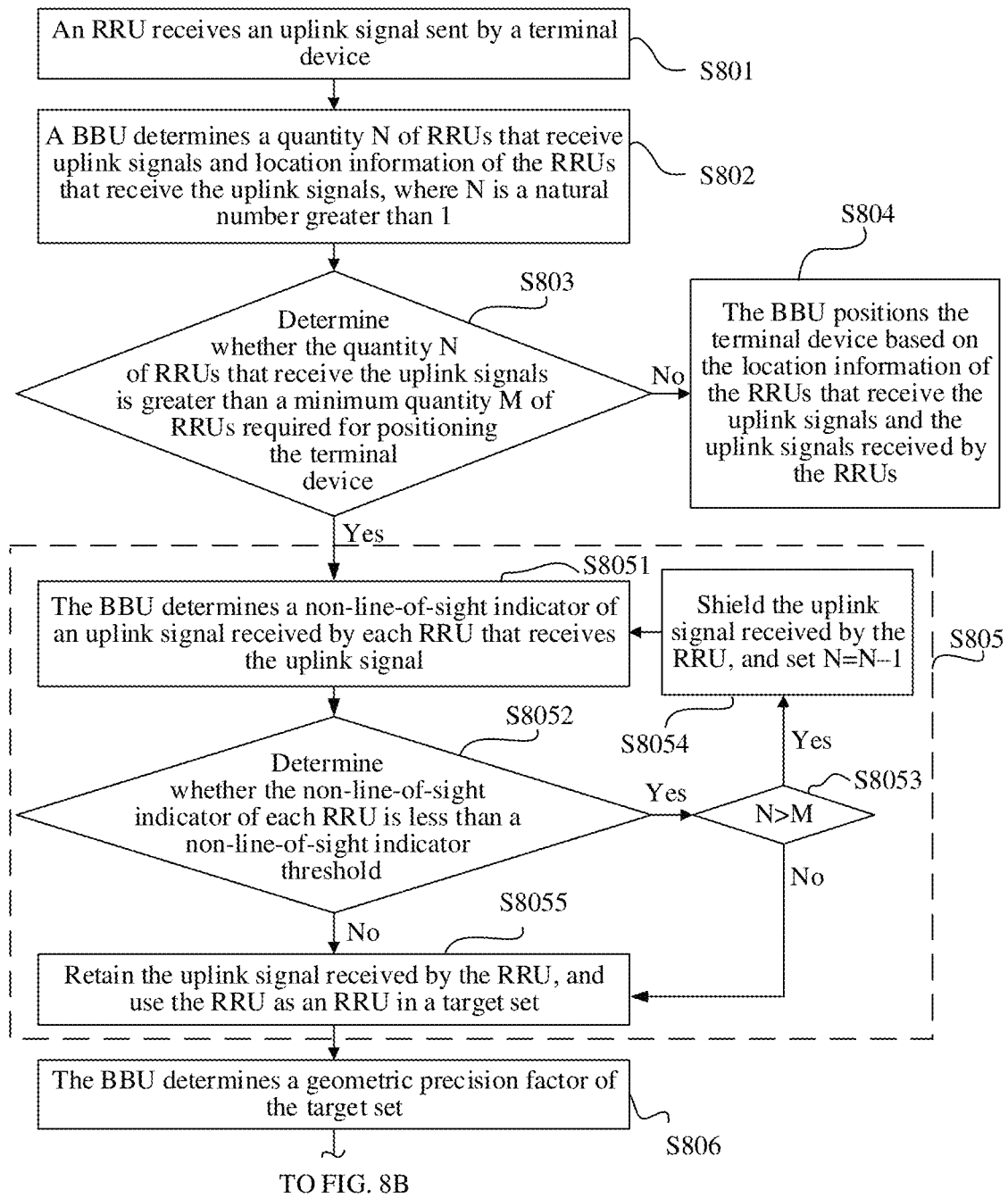
FIG. 8A and FIG. 8B are a flowchart of another method for determining a remote radio device according to an embodiment of this application.
Figure 8B:
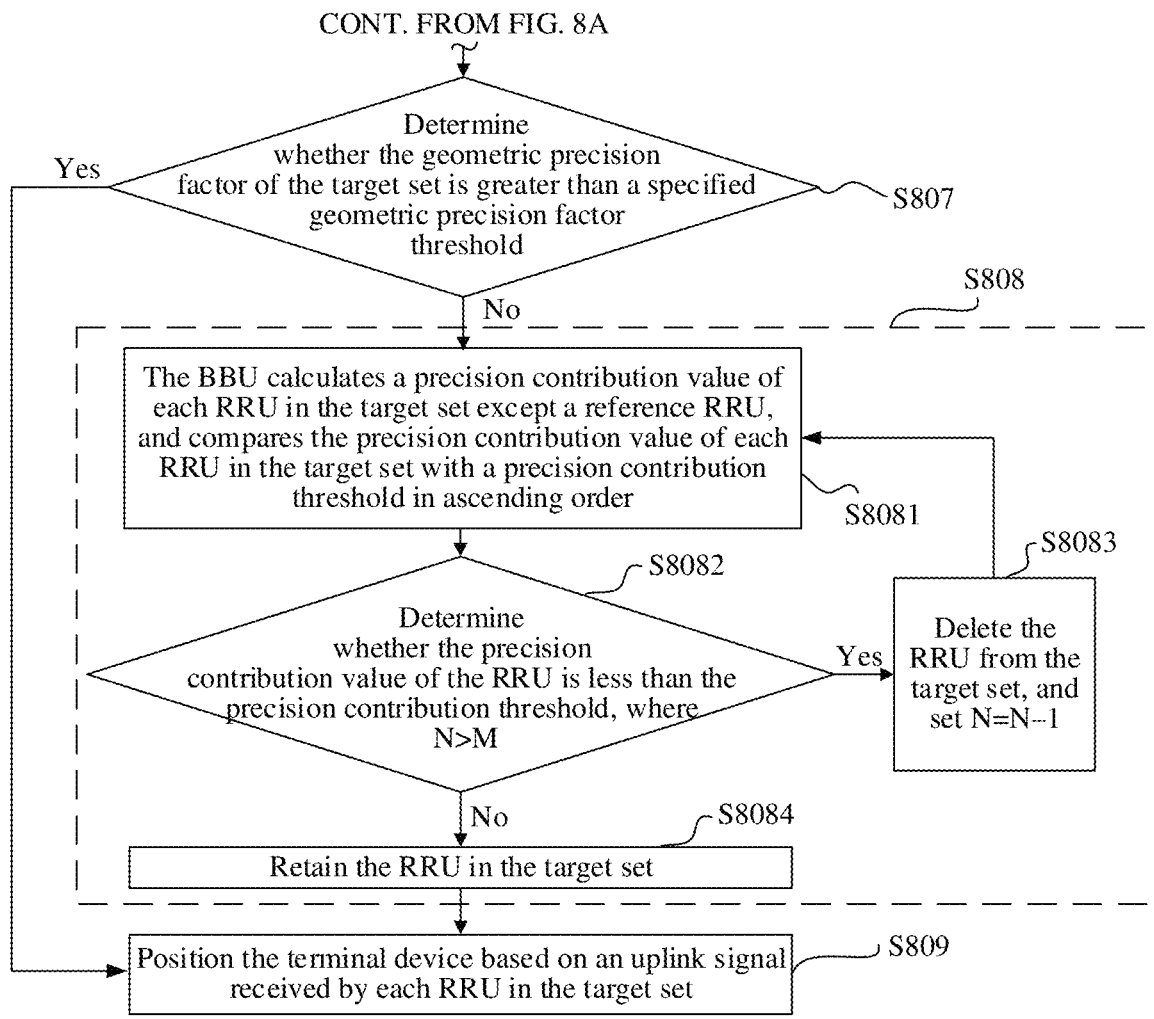

For example, FIG. 8A and FIG. 8B provide a flowchart of a method for determining a remote radio device. The method may be applied to, but is not limited to, the scenario shown in FIG. 5 in which positioning a terminal device is performed through uplink joint reception by a plurality of RRUs in a distributed AP. Refer to FIG. 8A and FIG. 8B. The method includes S801 to S809.

S801. An RRU receives an uplink signal sent by a terminal device.

In this embodiment, after the terminal device sends an uplink signal to a distributed AP, the uplink signal is received by a plurality of RRUs after transmitted on different transmission paths. The signal has different energy losses on different transmission paths. Therefore, uplink signals received by the plurality of RRUs are different.

S802. A BBU determines a quantity N of RRUs that receive the uplink signal and location information of the RRUs that receive the uplink signal, where N is a natural number greater than 1.

In this embodiment, because RRUs of the distributed AP are deployed at a relatively long distance, after the terminal device sends an uplink signal to the AP, not all RRUs can receive the uplink signal. Therefore, after the terminal device sends the uplink signal to the AP, the BBU needs to determine a quantity of RRUs that receive the uplink signal and location coordinates of the RRUs that receive the uplink signal. The RRUs that receive the uplink signal are RRUs that can participate in positioning the terminal device. That the BBU determines a quantity of RRUs that receive the uplink signal is determining a quantity of RRUs that can participate in positioning the terminal device.

S803. The BBU determines a minimum quantity M of RRUs required for positioning the terminal device. When the quantity of RRUs that receive the signal is greater than the minimum quantity of RRUs required for positioning the terminal device, step S805 is performed; otherwise, step S804 is performed.

In this embodiment, because the terminal device needs to be positioned, after the RRU receives the uplink signal sent by the terminal device, the BBU further needs to determine whether the quantity N of RRUs that receive the uplink signal is greater than the minimum quantity M of RRUs that can implement positioning of the terminal device. M is a natural number greater than 2.

Generally, in a two-dimensional planar space, location information of at least two RRUs is required for positioning the terminal device. In a three-dimensional space, location information of at least four RRUs is required for positioning the terminal device.

S804. The BBU positions the terminal device based on the location information of the RRUs that receive the uplink signal and uplink signals received by the RRUs.

In this embodiment, when the BBU determines that N=M, the BBU positions the terminal device based on the location information of the RRUs that receives the uplink signal. When the BBU determines that N<M, the BBU stops positioning the current terminal device, or the BBU performs positioning based on location information of an RRU in another distributed AP. The RRU in the another distributed AP is an RRU that is in the another distributed AP and that receives the uplink signal sent by the terminal device.

S805. The BBU determines a non-line-of-sight indicator of an uplink signal received by each RRU that receives the uplink signal, and compares the non-line-of-sight indicator of the uplink signal received by each RRU with a specified non-line-of-sight indicator threshold to obtain a target set.

In this embodiment, when the BBU determines that N>M, the BBU may filter, based on a parameter of the uplink signal received by the RRU, the N RRUs that receive the uplink signal. The parameter of the uplink signal may be a line-of-sight (LOS) indicator or a non-line-of-sight (NLOS) indicator of the RRU. In an example, the BBU filters the N RRUs based on a non-line-of-sight indicator of each of the N RRUs, and removes an uplink signal that undergoes non-line-of-sight propagation, to avoid a positioning error caused by incorrect delay estimation of the uplink signal. Specifically, a process in which the BBU determines a non-line-of-sight indicator of an uplink signal received by each RRU that receives the uplink signal, and the BBU compares the non-line-of-sight indicator of each RRU with a specified non-line-of-sight indicator threshold to obtain a target set includes S8051 to S8055. S8051. The BBU determines the non-line-of-sight indicator of the uplink signal received by each RRU that receives the uplink signal. S8052. Compare the non-line-of-sight indicator of each RRU with the non-line-of-sight indicator threshold. When the non-line-of-sight indicator of the RRU is less than the non-line-of-sight indicator threshold, S8053 is performed; otherwise, S8055 is performed. S8053. Determine whether the quantity N of RRUs that receive the uplink signal is greater than the minimum quantity M of RRUs required for positioning the terminal device. When N>M, S8054 is performed; otherwise, S8055 is performed. S8054. Shield the uplink signal received by the RRU, and set N=N−1. S8055. Retain the uplink signal received by the RRU, and use the RRU as an RRU in the target set.

It should be noted that, the non-line-of-sight indicator threshold may be a threshold (for example, 6.0) manually determined in advance. The non-line-of-sight indicator threshold may be adjusted based on an actual requirement. In this embodiment, when the non-line-of-sight indicator of the RRU is less than the non-line-of-sight indicator threshold, it may be considered that the uplink signal received by the RRU undergoes non-line-of-sight (NLOS) propagation. If the uplink signal received by the RRU is still used to position the terminal device, negative impact is caused on a positioning effect. Therefore, in S8053, when the BBU determines that the non-line-of-sight indicator of the RRU is less than the non-line-of-sight indicator threshold, and N>M, it indicates that the quantity of RRUs that receive the uplink signal meets the minimum quantity of RRUs required for positioning the terminal device, and in this case, the signal received by the RRU may be shielded. When the BBU determines that the non-line-of-sight indicator of the RRU is less than the non-line-of-sight indicator threshold, and N=M, it indicates that the quantity of RRUs used to position the terminal device cannot be reduced, and all remaining RRUs that receive the signal need to be used as RRUs in the target set.

In a possible example, the BBU may parse an uplink signal received by each of the plurality of RRUs. The BBU parses a PPDU header of the received uplink signal to obtain channel measurement H(f) of the uplink signal received by each RRU. Then, the BBU may use a sequence field (for example, VHT-LTF or HT-LTF) corresponding to the channel measurement to calculate a non-line-of-sight indicator of the uplink signal received by each RRU in the target set. The non-line-of-sight indicator may be defined in a plurality of manners. In a possible example, the BBU may determine the non-line-of-sight indicator $\Theta$ of the RRU by calculating kurtosis of a channel impulse response $h(\tau)$ of the uplink signal received by the RRU:

$$\theta = \frac{E\left[(h(\tau) - \mu)^4\right]}{\left(E\left[(h(\tau) - \mu)^2\right]\right)^2}$$

where $h(\tau)$ is the channel impulse response, and $h(\tau)$ may be obtained by performing inverse Fourier transform on the channel measurement H(f); $\mu$ represents an average value of $h(\tau)$; and E[ ] represents obtaining an expected value of content in the brackets, which may be approximated by using an average value during actual operations.

In a possible example, after the RRU receives the uplink signal sent by the terminal device, the RRU may determine a non-line-of-sight indicator of the received uplink signal. Only when the non-line-of-sight indicator of the uplink signal received by the RRU is greater than or equal to the non-line-of-sight indicator threshold, the RRU sends the received uplink signals to the BBU. When the non-line-of-sight indicator of the uplink signal received by the RRU is less than the non-line-of-sight indicator threshold, to avoid a problem that when the BBU receives no uplink signal sent by the RRU, the BBU cannot perform clear channel assessment (clear channel assessment, CCA), so that the BBU incorrectly considers that a spatial channel on which the RRU is located is idle, when the RRU determines that the non-line-of-sight indicator of the uplink signal received by the RRU is less than the non-line-of-sight indicator threshold, and the RRU chooses not to send the signal to the BBU, the RRU still needs to transmit some information (such as an RSSI of the signal) to the BBU, so that the BBU learns that the RRU receives the signal and learns strength of the signal (the information may be transmitted on a control signal path between the BBU and the RRU). This is distinguished from a case in which the RRU receives no signal, facilitating the BBU to perform correct clear channel assessment.

S806. The BBU determines a geometric precision factor of the target set.

In this embodiment, after the BBU determines RRUs that can be used to position the terminal device, when a quantity of RRUs in the target set is greater than the minimum quantity required for positioning the terminal device, the BBU may further continue to perform selection among the RRUs in the target set by using a parameter of an uplink signal received by each RRU in the target set. The parameter of the uplink signal may include a precision contribution value of the RRU. Before the BBU selects an RRU in the target set based on a precision contribution value of the RRU, the BBU may first determine the geometric precision factor of the target set. The BBU determines, by calculating the geometric precision factor of the target set, whether the quantity of RRUs in the target set can be further reduced. When the geometric precision factor of the target set is relatively large, it indicates that when the terminal device is positioned based on signals received by the RRUs in the target set, positioning precision is relatively low, and the quantity of RRUs in the target set cannot be further reduced. When the geometric precision factor of the target set is relatively small, it indicates that when the terminal device is positioned based on the signals received by the RRUs in the target set, positioning precision is relatively high. To reduce operation complexity in a positioning process, the BBU may delete an RRU with a largest precision contribution value from the target set. In this way, the operation complexity in the positioning process is reduced on a premise that accuracy of positioning the terminal device is ensured.

S807. Compare the geometric precision factor of the target set with a specified geometric precision factor threshold. When the geometric precision factor of the target set is greater than the specified geometric precision factor threshold, S809 is performed; otherwise, S808 is performed.

In this embodiment, it is assumed that the target set obtained in S805 is $\Omega=\{RRU_{k0}, RRU_{k1} \ldots RRU_{kn}\}$. $RRU_{k0}$ is used as a reference. The BBU performs TDOA positioning on the terminal device to obtain a positioning result (x,y,z). A process in which the BBU positions the terminal device is the same as the TDOA positioning process in the embodiment corresponding to FIG. 4, and details are not described herein again.

After the BBU positions the terminal device and obtains the positioning result, the BBU may calculate a geometric precision factor GDOP of $\Omega$ based on the positioning result. A smaller GDOP indicates a more precise positioning result. After the BBU determines GDOP of the target set, the BBU compares GDOP with a preset geometric precision factor threshold $GDOP_t$. When $GDOP>GDOP_t$, it indicates that positioning precision is relatively low when the RRUs in the target set are used to position the terminal device, and the quantity of RRUs participating in positioning cannot be further reduced. In this case, all the RRUs in the target set need to be retained. When $GDOP \leq GDOP_t$, it indicates that positioning precision is relatively high when the RRUs in the target set are used to position the terminal device. To reduce an operation amount in a positioning process, the RRUs in the target set may continue to be reduced.

In a possible example, when the GDOP of the target set is calculated, $$GDOP = \sqrt{trace((H^T H)^{-1})}$$

where trace( ) represents tracing the matrix in the parentheses; and $$H_{Xi} = \frac{x - x_{ki}}{r_{ki}} - \frac{x - x_{k0}}{r_{k0}}, H_{Yi} = \frac{y - y_{ki}}{r_{ki}} - \frac{y - y_{k0}}{r_{k0}},$$

$$H_{Zi} = \frac{z - z_{ki}}{r_{ki}} - \frac{z - z_{k0}}{r_{k0}} H = \begin{bmatrix} H_{X1} & H_{Y1} & H_{Z1} \\ \cdots & \cdots & \cdots \\ H_{Xn} & H_{Yn} & H_{Zn} \end{bmatrix},$$

$$H_{Xi} = \frac{x - x_{ki}}{r_{ki}} - \frac{x - x_{k0}}{r_{k0}}, H_{Yi} = \frac{y - y_{ki}}{r_{ki}} - \frac{y - y_{k0}}{r_{k0}},$$

$$H_{Zi} = \frac{z - z_{ki}}{r_{ki}} - \frac{z - z_{k0}}{r_{k0}}$$

where $r_{ki}$ represents a distance from the positioning target to $RRU_{ki}$.

S808. The BBU calculates a precision contribution value of each RRU in the target set, and updates RRUs in the target set based on the precision contribution value of each RRU.

In this embodiment, when GDOP≤GDOP$_t$, to reduce an operation amount in the positioning process, the RRUs in the target set may continue to be reduced. Specifically, a precision contribution value ΔGDOP$_{ki}$ of each RRU in the target set except the reference RRU may be calculated. Then, the BBU compares the precision contribution value of each RRU in the target set with a precision contribution threshold ΔGDOP$_t$, and updates the RRUs in the target set based on a comparison result. Specifically, a process includes S8081 to S8084. S8081. The BBU calculates the precision contribution value ΔGDOP$_{ki}$ of each RRU in the target set except the RRU used as a reference, and compares the precision contribution value ΔGDOP$_{ki}$ of each RRU in the target set with the precision contribution threshold ΔGDOP$_t$ in ascending order. S8082. Determine whether the precision contribution value ΔGDOP$_{ki}$ of the RRU is less than the precision contribution threshold ΔGDOP$_t$, and whether N>M. When ΔGDOP$_{ki}$<ΔGDOP$_t$ and N>M, S8083 is performed; otherwise, S8084 is performed. S8083. Delete the RRU from the target set, and assume that N=N−1. S8084. Retain the RRU in the target set.

It should be noted that, the precision contribution threshold may be a threshold manually determined in advance, for example, 0.2. The precision contribution threshold may be adjusted based on an actual requirement. In this embodiment, when the precision contribution value of the RRU is less than the precision contribution threshold, it may be considered that the RRU has little impact on positioning precision. When the quantity of RRUs used for positioning is greater than the quantity of RRUs required for positioning, the RRU may be deleted from the target set.

In a possible embodiment, a manner of calculating the precision contribution value ΔGDOP$_{ki}$ of the RRU is as follows:

$$\Delta GDOP_{ki} = \sqrt{trace\left(\frac{Gh_i^T h_i G}{1 - h_i G h_i^T}\right)}$$

where $G = (H^T H)^{-1}$, and $h_i$ represents an $i^{th}$ row of H.

It should be noted that, when the BBU positions the terminal device, S806, S807, and S808 are optional steps. When the quantity of RRUs included in the target set determined in S805 is greater than the quantity of RRUs required for positioning the terminal device, the BBU may perform S806, S807, and S808 to remove an RRU with a relatively low precision contribution value from the target set, so that the operation complexity in the positioning process is reduced. Alternatively, the BBU may directly position the terminal device based on an uplink signal received by each RRU in the target set determined in S805.

S809. Position the terminal device based on an uplink signal received by each RRU in the target set.

In this embodiment, after determining the target set, the BBU may position the terminal device based on the uplink signal received by each RRU in the target set and location information of each RRU. For example, the BBU uses a TDOA algorithm to position the terminal device. A specific implementation of the TDOA algorithm is the same as that in the embodiment corresponding to FIG. 4. Details are not described herein.

It may be understood that the TODA algorithm is merely an example algorithm provided in this embodiment, and a positioning algorithm in this embodiment of this application is not limited. When positioning the terminal device, the BBU may alternatively use time of arrival TOA, angle of arrival AOA, or other positioning algorithms.

In this embodiment of this application, before the BBU positions the terminal device, the BBU may select an RRU based on a parameter of the uplink signal received by each RRU. For example, the BBU may determine an NLOS indicator of the uplink signal received by each RRU, and remove an RRU signal that undergoes NLOS propagation, to avoid a positioning error caused by incorrect delay estimation of the signal. Further, the BBU calculates a geometric precision factor for remaining RRUs, and retains an RRU at a relatively proper location and contributing the most to positioning precision, to ensure positioning accuracy under a condition of proper operation complexity. It should be noted that, in the foregoing embodiments, the method for determining a remote radio device is described based on the distributed AP system. However, the method for determining a remote radio device provided in embodiments of this application is not limited to the distributed AP system.

In a possible example, the method for determining a remote radio device provided in embodiments of this application may also be applied to a 5G distributed base station networking architecture. Similar to the distributed AP architecture, network elements in the 5G distributed base station networking architecture are also classified into a BBU and a plurality of RRUs. Therefore, in the 5G distributed base station networking architecture, before performing joint reception, the BBU may perform selection on signals of the plurality of RRUs in the 5G distributed base station networking architecture. Then, joint reception is performed based on signals received by selected RRUs. Different from the distributed AP system, various indicators or thresholds specified in the distributed AP system may have different calculation methods or values in a 5G protocol, and need to be adjusted correspondingly. For example, a GI in the 5G protocol may be set to 0.29 μs, 0.59 μs, 1.17 μs, 2.34 μs, 4.69 μs, or the like based on different parameter settings.

In another possible example, the method for determining a remote radio device provided in embodiments of this application may also be applied to a multi-AP coordinated WLAN networking architecture. In this architecture, although there is no classification of a BBU and an RRU, similarly, a signal of a terminal device is received by a plurality of APs, and the plurality of APs may send signals to a master AP. Herein, it may be considered that the plurality of APs that receive the signal perform functions of the RRUs in the present invention, and the master AP performs functions of the BBU in the present invention. Different from the distributed AP system, in the multi-AP coordinated WLAN networking architecture, the plurality of APs run independently and use their own clocks. Therefore, to ensure decoding or positioning accuracy, strict time and frequency synchronization needs to be performed between the APs periodically. To enable the plurality of APs to receive the terminal signal at the same time, the APs need to communicate with each other to control and schedule the APs together.

Figure 9:
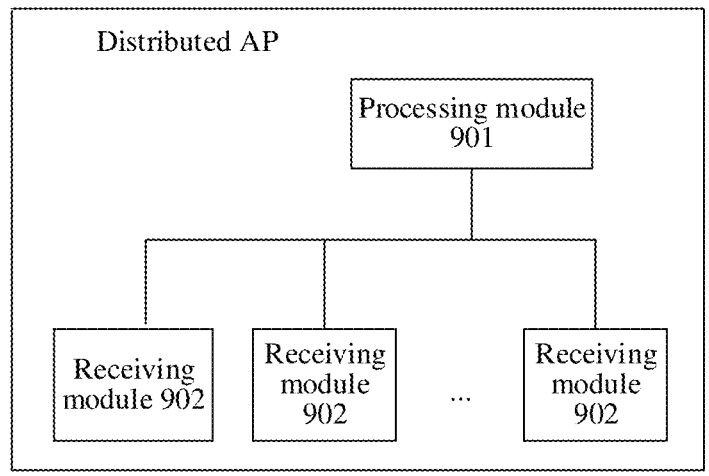
FIG. 9 is a schematic diagram of a structure of a distributed AP according to an embodiment of this application.

For example, FIG. 9 is a schematic diagram of a structure of a distributed AP according to an embodiment of this application. Refer to FIG. 9. The distributed AP includes a processing module 901 and a plurality of receiving modules 902. Any one of the plurality of receiving modules 902 is configured to receive a sent uplink signal.

The processing module 901 is configured to determine parameters of uplink signals received by the plurality of receiving modules 902.

The processing module 901 is further configured to select, based on the parameters, at least one receiving module 902 from the plurality of receiving modules 902 as a receiving module in the target set.

The processing module 901 is further configured to perform decoding based on an uplink signal received by the receiving module in the target set, or position a terminal device based on an uplink signal received by the receiving module 902 in the target set.

It should be understood that the foregoing distributed AP system is configured to perform the method in the foregoing embodiment. An implementation principle and a technical effect of a corresponding program module in the system are similar to those described in the foregoing method. For a working process of the apparatus, refer to a corresponding process in the foregoing method. Details are not described herein again.

The embodiment of the distributed AP described in FIG. 9 is merely an example. For example, the module division is merely logical function division and may be other division in actual implementation. For example, a plurality of modules or components may be combined or integrated into another system, or some features may be ignored or not performed. Functional modules in embodiments of this application may be integrated into one processing module, or each module may exist alone physically, or two or more modules may be integrated into one module.

For example, each module in FIG. 9 may be implemented in a form of hardware, or may be implemented in a form of a software functional module. For example, when software is used for implementation, the processing module 901 may be implemented by a software functional module generated by the BBU in FIG. 5 after the BBU reads program code stored in a memory. The plurality of receiving modules 902 may be implemented by software functional modules generated by the plurality of RRUs in FIG. 5 after the plurality of RRUs read program code stored in a memory.

The method steps in embodiments of this application may be implemented in a hardware manner or may be implemented in a manner of executing software instructions by a processor. The software instructions may include corresponding software modules. The software modules may be stored in a random access memory (random access memory, RAM), a flash memory, a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), a register, a hard disk, a removable hard disk, a CD-ROM, or a storage medium in any other form well known in the art. The storage medium is coupled to the processor, so that the processor can read information from the storage medium or write information into the storage medium. Certainly, the storage medium may alternatively be a component of the processor. The processor and the storage medium may be located in an ASIC.

All or some of the foregoing embodiments may be implemented by software, hardware, firmware, or any combination thereof. When software is used for implementation, all or some of the embodiments may be implemented in a form of a computer program product. The computer program product includes one or more computer instructions. When the computer program instructions are loaded and executed on a computer, all or some of the procedures or functions according to embodiments of this application are generated. The computer may be a general-purpose computer, a dedicated computer, a computer network, or another programmable apparatus. The computer instructions may be stored in a computer-readable storage medium, or transmitted by using the computer-readable storage medium. The computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (Solid State Disk, SSD)), or the like.

It may be understood that numerical symbols in embodiments of this application are differentiated merely for ease of description, but are not used to limit the scope of embodiments of this application.

The invention claimed is:

1. A method, the method comprising:
determining, by a baseband device, parameters of uplink signals received by N remote radio devices, wherein N is a natural number greater than 1;
selecting, by the baseband device, based on the parameters, at least one remote radio device from the N remote radio devices as a remote radio device in a target set; and
performing one of:
decoding, by the baseband device, based on an uplink signal received by the remote radio device in the target set; or
positioning a terminal device based on an uplink signal received by the remote radio device in the target set.

2. The method according to claim 1, wherein the parameters comprise signal quality parameters of the uplink signals received by the N remote radio devices; and
wherein the selecting, by the baseband device based on the parameters, the at least one remote radio device from the N remote radio devices as the remote radio device in the target set comprises:
determining, by the baseband device, based on the signal quality parameters, the at least one remote radio device from the N remote radio devices as the remote radio device in the target set, wherein quality of the uplink signal received by the remote radio device in the target set is greater than a signal quality threshold.

3. The method according to claim 1, wherein the parameters of the uplink signals comprise one or more of a quantity of remote radio devices that receive the uplink signals, time at which the N remote radio devices receive the uplink signals, or line-of-sight indicators and precision contribution values of the N remote radio devices.

4. The method according to claim 2, wherein the signal quality parameters comprise signal strength values; and
wherein a signal strength value of the uplink signal received by the remote radio device in the target set is greater than a signal strength threshold.

5. The method according to claim 2, wherein the signal quality parameters comprise signal strength values;
wherein the baseband device determines a signal strength value of a first received uplink signal, and records a first time at which the signal strength value is obtained; and
wherein a signal strength value of the uplink signal received by the remote radio device in the target set is greater than a signal strength threshold, and a time of arrival of the uplink signal received by the remote radio device in the target set is less than or equal to the first time.

6. The method according to claim 4, wherein a time difference between uplink signals received by any two remote radio devices in the target set is less than a signal guard interval time.

7. The method according to claim 1, wherein the method further comprises:
determining, by the baseband device, based on the parameters, M remote radio devices from the N remote radio devices as remote radio devices in the target set, wherein M is a minimum quantity of remote radio devices required for positioning the terminal device, and $2 \leq M < N$.

8. The method according to claim 7, wherein the selecting, by the baseband device, based on the parameters, the at least one remote radio device from the N remote radio devices as the remote radio device in the target set comprises:
determining, by the baseband device, based on a line-of-sight indicator of each remote radio device, M remote radio devices from the N remote radio devices as remote radio devices in the target set.

9. The method according to claim 8, wherein the method further comprises, after the determining, based on the line-of-sight indicator of each remote radio device, the M remote radio devices from the N remote radio devices as remote radio devices in the target set:
comparing, by the baseband device, a precision contribution value of each remote radio device with a precision contribution threshold; and
retaining, by the baseband device, in the target set, a remote radio device of the N remote radio devices whose precision contribution value is greater than the precision contribution threshold.

10. A distributed access point (AP), comprising a baseband device, wherein the baseband device is configured to:
determine parameters of uplink signals received by N remote radio devices, wherein N is a natural number greater than 1;
select, based on the parameters, at least one remote radio device from the N remote radio devices as a remote radio device in a target set; and
perform one of:
decoding based on an uplink signal received by the remote radio device in the target set; or
position a terminal device based on an uplink signal received by the remote radio device in the target set.

11. The distributed AP according to claim 10, wherein the parameters comprise signal quality parameters of the uplink signals received by the N remote radio devices; and
wherein the baseband device is further configured to determine, based on the signal quality parameters, the at least one remote radio device from the N remote radio devices as the remote radio device in the target set, wherein quality of the uplink signal received by the remote radio device in the target set is greater than a signal quality threshold.

12. The distributed AP according to claim 10, wherein the parameters of the uplink signals comprise one or more of a quantity of remote radio devices that receive the uplink signals, time at which the N remote radio devices receive the uplink signals, or line-of-sight indicators and precision contribution values of the N remote radio devices.

13. The distributed AP according to claim 11, wherein the signal quality parameters comprise signal strength values, and a signal strength value of an uplink signal received by each remote radio device in the target set is greater than a preset signal strength threshold.

14. The distributed AP according to claim 11, wherein the signal quality parameters comprise signal strength values, and wherein the baseband device is further configured to:
determine a signal strength value of a first received uplink signal; and
record a first time at which the signal strength value is obtained;
wherein a signal strength value of the uplink signal received by the remote radio device in the target set is greater than a signal strength threshold, and a time of arrival of the uplink signal received by the remote radio device in the target set is less than or equal to the first time.

15. The distributed AP according to claim 13, wherein a time difference between uplink signals received by any two remote radio devices in the target set is less than a signal guard interval time.

16. The distributed AP according to claim 10, wherein the baseband device is further configured to:
determine, based on the parameters, M remote radio devices from the N remote radio devices as remote radio devices in the target set, wherein M is a minimum quantity of remote radio devices required for positioning the terminal device, and $2 \leq M < N$.

17. The distributed AP according to claim 16, wherein the baseband device is further configured to:
determine, based on a line-of-sight indicator of each remote radio device, M remote radio devices from the N remote radio devices as remote radio devices in the target set.

18. The distributed AP according to claim 17, wherein the baseband device is further configured to, after determining, based on the line-of-sight indicator of each remote radio device, the M remote radio devices from the N remote radio devices as the remote radio devices in the target set:
compare a precision contribution value of each remote radio device with a precision contribution threshold; and
retain, in the target set, a remote radio device whose precision contribution value is greater than the precision contribution threshold.

* * * * *